3,819,697
SUBSTITUTED PHENYLUREA HERBICIDES
Barrington Cross, Rocky Hill, N.J., assignor to American Cyanamid Company, Stamford, Conn.
No Drawing. Filed Mar. 4, 1970, Ser. No. 16,580
Int. Cl. C07c 127/18
U.S. Cl. 260—553 A          5 Claims

ABSTRACT OF THE DISCLOSURE

The invention is directed to herbicidally active compounds and compositions and to herbicidal processes having as an active ingredient a compound represented by the formula:

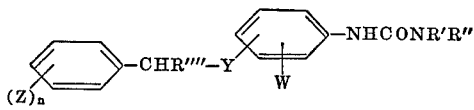

wherein R' is selected from the group consisting of H, $CH_3$, $C_2H_5$; R" is a member selected from the group consisting of H, and lower alkyl; W is a member selected from the group consisting of H, halo, lower alkyl, and $NO_2$; Y is a member selected from the group consisting of S, O, SO, and $SO_2$; Z is a member selected from the group consisting of $NO_2$, $NH_2$, $N(R''')_2$, halo, lower alkyl, $X_m$—R'''—, R'''O—, R'''S(O)$_n$—, R'''NH—, —OH, —COOH, —COOR''', —CN, —NHCON(R''')$_2$ and R'''CONH—; X is halo; R''' is lower alkyl; R'''' is hydrogen, lower alkyl or phenyl; $n$ is 0, 1 to 2; and $m$ is 1, 2 or 3.

---

This invention relates to novel benzyloxy, benzylthio, benzylsulfinyl and benzylsulfonyl phenylureas and to processes for their preparation. It further relates to their use as herbicides and to herbicidal compositions containing the phenylurea compounds as active ingredients. More particularly, the invention relates to those phenylurea compounds which are represented by the formula:

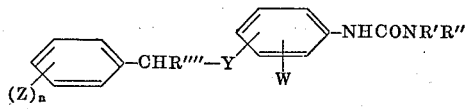

Formula I wherein R' is selected from the group consisting of H, $CH_3$, $C_2H_5$; R" is a member selected from the group consisting of H, and lower alkyl; W is a member selected from the group consisting of H, halo, lower alkyl, and $NO_2$; Y is a member selected from the group consisting of S, O, SO, and $SO_2$; Z is a member selected from the group consisting of $NO_2$, $NH_2$, $N(R''')_2$, halo, lower alkyl, $X_m$—R'''—, R'''O—, R'''S(O)$_n$—, R'''NH—, —OH, —COOH, —COOR''', —CN, —NHCON(R''')$_2$ and R'''CONH—; X is halo; R''' is lower alkyl; R'''' is hydrogen, lower alkyl or phenyl; $n$ is 0, 1 or 2; and $m$ is 1, 2 or 3. As used herein, halo is a member selected from the group consisting of fluoro, bromo, chloro and iodo; lower alkyl has from 1 to 4 carbon atoms, such as, for example, methyl, ethyl, n-propyl, iso-propyl, n-butyl and t-butyl.

It has now been found that unexpectedly effective control of undesirable plant life can be attained by application of the compounds of Formula I. The compounds may be advantageously employed in standard preemergence or postemergence treatment of undesired plant life. For example, they are herbicidally effective when applied to the foliage of either monocotyledonous or dicotyledonous plants or when applied to soils or sand containing seeds of such plants.

In general, the compounds of Formula I may be conveniently prepared by reacting the appropriately substituted aniline precursors with a variety of reactants such as (1) an appropriately substituted carbamoyl chloride, (2) phosgene and then an appropriate primary and secondary amine or (3) an appropriate alkyl isocyanate. General procedures are set forth below:

Carbamoyl Chloride Synthesis of the Phenylureas

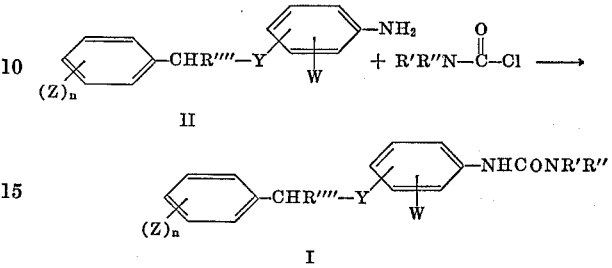

wherein R', R", W, Y, Z and $n$ are as previously defined.

A substituted aniline compound of Formula II (0.1 mole) and 0.1 mole of an acid acceptor such as triethylamine, pyridine or sodium carbonate are added to an aprotic solvent such as benzene, a liquid hydrocarbon, acetone, ether, dioxane, dimethylformamide, acetonitrile, tetrahydrofuran, or the like, and then treated with approximately 0.1 to 0.5 moles of the appropriately substituted carbamoyl chloride. The reaction is generally carried out at a temperature of about 10° C. with stirring. The reaction is usually complete in 30 minutes at room temperature, however, sometimes warming to solvent reflux is required. When using dimethylformamide or acetone as the solvent, the product is isolated by pouring into ice water, making it alkaline with sodium acetate and filtering off the crude product. Purification may be accomplished by recrystallization or by chromatographic separation on a column of silica gel using an acetone-benzene mixture as the eluent. When using a solvent which is nonmiscible with water, e.g., benzene or ethers, the reaction is quenched by successively washing the organic layer with: (1) dilute aqueous, hydrochloric acid, (2) water, (3) dilute, aqueous sodium carbonate. The organic layer is then dried over anhydrous magnesium sulfate and the solvent is removed by distillation. The crude urea compound is purified as set forth above.

Phosgene Synthesis of the Phenylureas

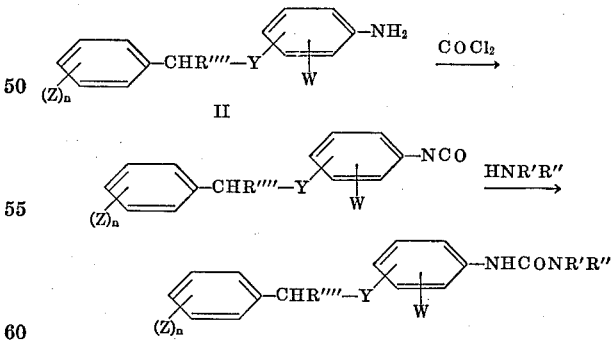

The substituted aniline compound of Formula II (0.1 mole) is dissolved in a suitable aprotic solvent, such as, for example, toluene (100–500 ml.) optionally containing a base, such as, sodium acetate or sodium carbonate (0.2 mole). Phosgene is bubbled through the solution, effecting a temperature rise to from about 50 to about 80° C. After 1 hour, the mixture is filtered and evaporated under reduced pressure. The residue is dissolved in toluene (50–500 ml.) and gaseous dimethylamine is added at 15° with ice cooling. The alkaline solution is ether extracted, washed with dilute hydrochloric acid, and then water. Insoluble impurities are filtered off. The ether solution is dried over anhydrous magnesium sulfate and then evaporated to dryness. The residue is purified by recrystallization.

Alkyl Isocyanate Synthesis of the Phenylureas

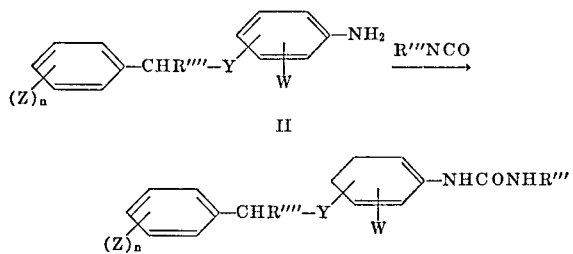

A substituted aniline compound of Formula II (0.01 mole) is dissolved in from about 20 to about 100 ml. of a suitable aprotic solvent, such as, for example, ethyl ether, benzene, toluene, xylene, acetone, dimethylformamide, light petroleum, dioxane or tetrahydrofuran. One drop of triethylamine or pyridine is added and then the solution is cooled to about 10° C. on an ice bath. The appropriately substiuted alkyl isocyanate (preferably from about 0.01 to about 0.05 mole) is added to the solution with stirring and the resulting solution is allowed to sit overnight at room temperature. The desired urea in the form of a precipitate is removed by filtration and purified by recrystallization.

Where the desired product is not formed upon standing overnight, the reaction mixture is heated to 100° C. for a period of about 120 hours. Where it does not precipitate from solution, precipitation is induced by the addition of hexane to the reaction mixture.

Oxidation of Benzylthio Phenylureas

Alternatively, the benzylsulfinyl and benzylsulfonyl phenylurea compounds of Formula I may be prepared by oxidation of the appropriate benzylthio phenylurea compound. A general procedure and the reaction scheme is as follows:

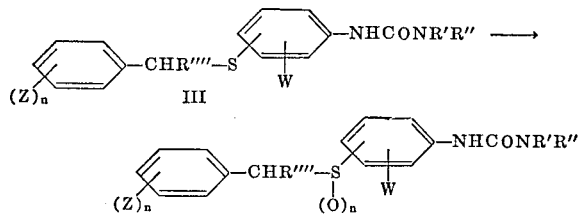

Oxidation of a benzylthio phenylurea compound of Formula III to the corresponding sulfinyl or sulfonyl compound is accomplished by standard oxidation procedures. Illustrative procedures are oxidation with a peracid, such as peracetic acid, pertrifluoroacetic acid, or a perbenzoic acid; oxidation with hydrogen peroxide, or with potassium permanganate. A preferred oxidizing agent is $m$-chloroperbenzoic acid in chloroform or suitable aprotic solvent, such as toluene or benzene.

Formation of the sulfonyl compound by oxidation may be effected by mixing the appropriate benzylthio phenylurea with 2 moles of an oxidizing agent, such as, $m$-chloroperbenzoic acid in a chloroform solution at 20–25° for a period of about 1 to about 40 hours. The desired product is isolated by washing with aqueous sodium carbonate, drying over an hydrous magnesium sulfate, evaporating off the solvent and purifying the resulting solid by recrystallization from a solvent, such as chloroform. The corresponding sulfinyl compounds are prepared by mixing the appropriate benzylthio phenylurea compound with one molar equivalent of $m$-chloroperbenzoic acid in a chloroform solution at −5° C. The desired product is generally isolated as above; however, in some cases, chromatography on a silica gel column with an ethyl acetate eluent was required in order to effect purification of the crystalline product.

Preparation of the Aniline Precursors

The substituted benzyloxy and benzylthio aniline compounds of Formula II are conveniently prepared by a variety of conventional procedures, such as, by standard reductions of the corresponding readily available nitro compounds. Among the conventional reagents which are suitable for such reduction, a mixture of iron or tin and hydrochloric acid is preferred. A typical reduction is schematically set forth below:

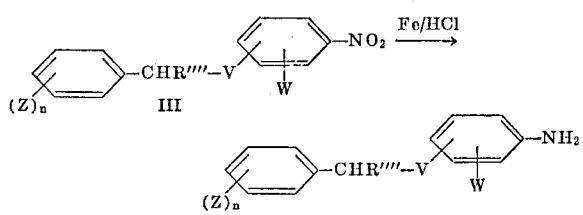

wherein W, Z, R"" and $n$ are as defined above, and V is oxygen or sulfur.

Synthesis of the Phenylureas by Nucleophilic Substitution

Further synthetic routes to the benzyloxyphenylureas are provided by nucleophilic substitutions between a halobenzyl compound, such as, benzyl bromide or chloride and a nitrophenol or a hydroxy substituted phenylurea.

The benzylthiophenylureas may be prepared by either reacting a benzyl mercaptan with the appropriate bromo or chloro substituted nitrobenzene or by reacting a nitrophenyl mercaptan with a halobenzyl compound, such as, benzyl chloride or bromide.

In a typical nucleophilic substitution, equal molar quantities of a base, such as, anhydrous potassium carbonate, potassium $t$-butoxide, sodium methoxide or pyridine, the halo compound and the hydroxy or thiohydroxy compound are refluxed in acetone for a period of up to 8 hours or more. The resulting inorganic salts are dissolved by the addition of water. If the desired product precipitates from the aqueous solution, it is collected by filtration and dried. Where precipitation does not occur, the desired product is extracted from the aqueous solution with an organic solvent, such as, benzene, or chlorform; and, the resulting solution is dried over anhydrous magnesium sulfate and evaporated to dryness. The crystalline products are purified by recrystallization or by chromatography on a silica gel column.

Illustrative of suitable carbamoyl chlorides are dimethyl carbamoyl chloride, diethyl carbamoyl chloride, ethyl $n$-propyl carbamoyl chloride, methyl $t$-butyl carbamoyl chloride, etc.

Illustrative of suitable alkyl isocyanate compounds are methyl isocyanate, ethyl isocyanate, $n$-propyl isocyanate, $iso$-propyl isocyanate, $n$-butyl isocyanate, $t$-butyl isocyanate, etc.

Illustrative of suitable amines used in the phosgene synthesis of the phenylureas are, for example, ammonia, methylamine, ethylamine, dimethylamine, diethylamine, methylethylamine, $i$-propylamine, $n$-butylamine, $t$-butylamine, etc.

Illustrative of the numerous suitable substituted, aniline compounds of Formula II are, for example:

2-(benzyloxy)aniline,
3-(benzyloxy)-4-chloroaniline,
3-($p$-chlorobenzyloxy)aniline,
4-(benzyloxy)-3-chloroaniline,
4-(benzyloxy)-2-chloroaniline,
4-(benzyloxy)-3-nitroaniline,
4-($p$-chlorobenzyloxy)-3-chloroaniline,
4-($m$-bromobenzyloxy)-2-bromoaniline,
3-chloro-4-($p$-nitrobenzyloxy)aniline,
3-($p$-nitrobenzyloxy)aniline,
4-($p$-aminobenzyloxy)-3-chloroaniline,
2-benzyloxy-4-iodoaniline, 4-(p-aminobenzyloxy)aniline,
2-benzyloxy-4-fluoroaniline,
3-chloro-4-(p-dimethylaminobenzyloxy)aniline,
4-(2,6-dichlorobenzyloxy)aniline,
3-chloro-4-(p-ethylaminobenzyloxy)aniline,
4-(p-dimethylaminobenzyloxy)aniline,
3-chloro-4-(p-methylthiobenzyloxy)aniline,
4-(p-methylthiobenzyloxy)aniline,
3-chloro-4-(p-methylsulfonylbenzyloxy)aniline,
4-(p-methylsulfonylbenzyloxy)aniline,
3-chloro-4-[p-(3,3-dimethylureido)benzyloxy]aniline,
4-(p-propionamidobenzyloxy)aniline,
3-chloro-4-(p-methoxybenzyloxy)aniline,
4-(p-bromobenzyloxy)aniline,
3-bromo-(p-benzyloxy)aniline,
2-methyl-4-(benzyloxy)aniline,
4-(p-methylbenzyloxy)aniline,
4-(o-methylbenzyloxy)aniline,
3-chloro-4-(o-methylbenzyloxy)aniline,
3-(p-cyanobenzyloxy)aniline,
3-chloro-4-(p-carboxybenzyloxy)aniline,
3-chloro-4-(p-cyanobenzyloxy)aniline,
3-chloro-4-(benzylthio)aniline,
3-chloro-4-(benzylsulfonyl)aniline,
p-(benzylsulfinyl)aniline,
p-(benzylsulfonyl)aniline,
p-(p-chlorobenzyloxy)aniline,
m-(benzyloxy)aniline,
p-(benzyloxy)aniline,
p-(benzylthio)aniline,
3-chloro-4-(p-chlorobenzyloxy)aniline,
4-(benzyloxy)-3-chloroaniline,
3-(p-chlorobenzyloxy)aniline,
3-chloro-4-(p-chlorobenzyloxy)aniline,
4-(p-chlorobenzyloxy)-3-nitroaniline,
4-(p-hydroxybenzyloxy)aniline,
3-(p-chlorobenzyloxy)aniline,
3-chloro-4-(p-carbethoxybenzyloxy)aniline,
3-n-propyl-4-(benzyloxy)aniline,
3-(benzylthio)-4-chloroaniline,
3-(p-chlorobenzylsulfonyl)aniline,
4-(benzylsulfinyl)-3-chloroaniline,
4-(benzylthio)-3-nitroaniline,
4-(p-chlorobenzylsulfonyl)-3-chloroaniline,
3-chloro-4-(p-nitrobenzylsulfinyl)aniline,
3-(p-nitrobenzylthio)aniline,
4-(p-aminobenzylsulfonyl)-3-chloroaniline,
4-(p-aminobenzylsulfinyl)aniline,
3-chloro-4-(p-dimethylaminobenzylthio)aniline,
3-chloro-4-(p-ethylaminobenzylsulfonyl)aniline,
4-(p-dimethylaminobenzylsulfinyl)aniline,
3-chloro-4-(p-methylthiobenzylthio)aniline,
4-(p-methylthiobenzylsulfonyl)aniline,
3-chloro-4-(p-methylsulfonylbenzylsulfinyl)aniline,
4-(p-methylsulfonylbenzylthio)aniline,
3-chloro-4-[p-(3,3-dimethylureido)benzylsulfonyl]-
  aniline,
4-(p-propionamidobenzylsulfinyl)aniline,
3-chloro-4-(p-methoxybenzylthio)aniline,
4-(p-bromobenzylsulfonyl)aniline,
3-bromo-(p-benzylsulfinyl)aniline,
2-methyl-4-(benzylthio)aniline,
4-(p-methylbenzylsulfonyl)aniline,
3-chloro-4-(p-methylbenzylsulfinyl)aniline,
4-(o-methylbenzylthio)aniline,
3-chloro-4-(o-methylbenzylsulfonyl)aniline,
3-(p-cyanobenzylsulfinyl)aniline,
3-chloro-4-(4-methylbenzyloxy)aniline,
3-chloro-4-(p-methylbenzyloxy)aniline,
4-(p-trifluoromethylbenzyloxy)aniline,
4-(diphenylmethoxy)aniline,
4-[α-(p-chlorophenyl)-α-phenylmethylthio]aniline,
3-[α-(p-methylphenyl)-α-phenylmethylsulfonyl]aniline,
etc.

Illustrative of the suitable phenylurea compounds of Formula I are, for example:

3-[2-(benzyloxy)-phenyl]-1,1-dimethylurea,
3-[3-(benzyloxy)-4-chlorophenyl]-1,1-dimethylurea,
3-[3-(α-methylbenzyloxy)-4-chlorophenyl]-1,1-dimethyl-
  urea,
3-[3-(p-chlorobenzyloxy)phenyl]-1,1-dimethylurea,
3-[3-(p-chlorobenzyloxy)phenyl]-1,1-diethylurea,
3-[3-(p-chlorobenzyloxy)phenyl]-urea,
1-[4-(benzyloxy)-3-chlorophenyl]-3-t-butylurea,
1-[4-(α-ethylbenzyloxy)-3-chlorophenyl]-3-t-butylurea,
3-[4-(benzyloxy)-2-chlorophenyl]-1,1-dimethylurea,
1-[4-(benzyloxy)-3-nitrophenyl]-3-sec-butylurea,
1-[4-(α-t-butylbenzyloxy)-3-nitrophenyl]-3-sec-butyl-
  urea,
1-[4-(p-chlorobenzyloxy-3-chlorophenyl]-3-t-butylurea,
1-[4-(p-chlorobenzyloxy-3-chlorophenyl]-urea,
3-[4-(m-bromobenzyloxy)-2-bromophenyl]-1,1-dimeth-
  ylurea,
3-[3-chloro-4-(p-nitrobenzyloxy)phenyl]-1,1-dimethyl-
  urea,
3-[3-chloro-4-(p-nitrobenzyloxy)phenyl]-urea,
3-[3-(p-nitrobenzyloxy)phenyl]-1,1-dimethylurea,
3-[4-(p-aminobenzyloxy)-3-chlorophenyl]-1,1-dimeth-
  ylurea,
3-[4-(p-aminobenzyloxy)-3-chlorophenyl]-urea,
3-[2-(benzyloxy-4-iodophenyl]-1,1-dimethylurea,
3-[4-(p-aminobenzyloxy)phenyl]-1,1-dimethylurea,
3-[2-(benzyloxy-4-fluorophenyl]-1,1-dimethylurea,
3-[3-chloro-4-(p-dimethylaminobenzyloxy)phenyl]-
  1,1-dimethylurea,
3-[4-(2,6-dichlorobenzyloxy)phenyl]-1,1-dimethylurea,
3-[3-chloro-4-(p-ethylaminobenzyloxy)phenyl]-1,1-
  dimethylurea,
3-[3-chloro-4-(p-ethylaminobenzyloxy)phenyl]-urea,
3-[4-(p-dimethylaminobenzyloxy)phenyl]-1,1-dimethyl-
  urea,
3-[3-chloro-4-(p-methylthiobenzyloxy)phenyl]-1,1-
  dimethylurea,
3-[3-chloro-4-(p-methylthiobenzyloxy)phenyl]-urea,
3-[4-(p-methylthiobenzyloxy)phenyl]-1,1-dimethyl-
  urea,
3-[3-chloro-4-(p-methylsulfonylbenzyloxy)phenyl]-
  1,1-dimethylurea,
3-[4-(p-methylsulfonylbenzyloxy)phenyl]-1,1-dimethyl-
  urea,
3-{3-chloro-4-[p-(3,3-dimethylureido)benzyloxy]phenyl}-
  1,1-dimethylurea,
3-{3-chloro-4-[p-(3,3-dimethylureido)benzyloxy]-
  phenyl}-urea,
3-[4-(p-propionamidobenzyloxy)phenyl]-1,1-diethyl-
  urea,
3-[3-chloro-4-(p-methoxybenzyloxy)phenyl]-1,1-di-
  methylurea,
3-[4-(p-bromobenzyloxy)phenyl]-1,1-dimethylurea,
3-[3-bromo-(p-benzyloxy)phenyl]-1,1-dimethylurea,
3-[3-bromo-(p-benzyloxy)phenyl]-urea,
1-[2-methyl-4-(benzyloxy)phenyl]-3-t-butylurea,
3-[4-(p-methylbenzyloxy)phenyl]-1,1-dimethylurea,
3-[3-chloro-4-(p-methylbenzyloxy)phenyl]-1-t-butyl-1-
  methylurea,
3-[3-chloro-4-(p-methylbenzyloxy)phenyl]-urea,
3-[4-(o-methylbenzyloxy)phenyl]-1,1-dimethylurea,
3-[3-chloro-4-(o-methylbenzyloxy)phenyl]-1,1-dimethyl-
  urea,
3-[3-chloro-4-(o-methylbenzyloxy)phenyl]-urea,
3-[3-(p-cyanobenzyloxy)phenyl]-1,1-dimethylurea,
3-[3-chloro-4-(benzyloxy)phenyl]-1,1-dimethylurea,
3-[3-chloro-4-(iso-propylbenzyloxy)phenyl]-1,1-dimeth-
  ylurea,
1-[3-chloro-4-(p-carboxybenzyloxy)phenyl]-3-ethylurea,
3-[3-chloro-4-(p-cyanobenzyloxy)phenyl]-1,1-dimethyl-
  urea,
3-[3-chloro-4-(benzylthio)phenyl]-1,1-dimethylurea, 3-[3-chloro-4-(benzylsulfonyl)phenyl]-1,1-dimethylurea,
3-[*p*-(benzylthio)phenyl]-1,1-dimethylurea,
3-[*p*-(benzylsulfinyl)phenyl]-1,1-dimethylurea,
3-[*p*-(benzylsulfonyl)phenyl]-1,1-dimethylurea,
1-[*p*-(benzylsulfonyl)phenyl]-3-methylurea,
1-[*p*-(*p*-chlorobenzyloxy)phenyl]-3-methylurea,
3-[*m*-(benzyloxy)phenyl]-1,1-dimethylurea,
1-[*m*-(benzyloxy)phenyl]-3-methylurea,
3-[*p*-(benzyloxy)phenyl]-1,1-dimethylurea,
1-[*p*-(benzylthio)phenyl]-3-methylurea,
3-[3-chloro-4-(*p*-chlorobenzyloxy)phenyl]-1,1-dimethylurea,
3-[4-(benzyloxy)-3-chlorophenyl]-1,1-dimethylurea,
3-[*p*-(*p*-chlorobenzyloxy)phenyl]-1,1-dimethylurea,
1-[3-chloro-4-(*p*-chlorobenzyloxy)phenyl]-3-methylurea,
3-[4-(*p*-chlorobenzyloxy)-3-nitrophenyl]-1,1-dimethylurea,
3-[4-(*p*-hydroxybenzyloxy)phenyl]-1,1-dimethylurea,
3-[3-(*p*-chlorobenzyloxy)phenyl]-1,1-diethyl urea,
1-[3-chloro-4-(*p*-carbethoxybenzyloxy)phenyl]-3-diethylurea,
1-[3-*n*-propyl-4-(benzyloxy)phenyl]-3-*t*-butylurea,
3-[3-(benzylthio)-4-chlorophenyl]-1,1-dimethylurea,
3-[3-(benzylthio)-4-chlorophenyl]-urea,
3-[3-(*p*-chlorobenzylsulfonyl)phenyl]-1,1-dimethylurea,
3-[3-(*p*-chloro-α-methylbenzylsulfonyl)phenyl]-1,1-dimethylurea,
1-[4-(benzylsulfinyl)-3-chlorophenyl]-3-*t*-butylurea,
1-[4-(α-ethylbenzylsulfinyl)-3-chlorophenyl]-3-*t*-butylurea,
1-[4-(benzylthio)-3-nitropehnyl]-3-*sec*-butylurea,
1-[4-(α-methylbenzylthio)-3-nitropehnyl]-3-*sec*-butylurea,
1-[4-(*p*-chlorobenzylsulfonyl-3-chlorophenyl]-3-*t*-butylurea,
1-[4-(*p*-chloro-α-*n*-butylbenzylsulfonyl-3-chlorophenyl]-3-*t*-butylurea,
3-[3-chloro-4-(*p*-nitrobenzylsulfinyl)phenyl]-1,1-dimethylurea,
3-[4-(*p*-nitrobenzylthio)phenyl]-1,1-dimethylurea,
3-[4-(*p*-aminobenzylsulfonyl)-3-chlorophenyl]-1,1-dimethylurea,
3-[4-(*p*-aminobenzylsulfinyl)phenyl]-1,1-dimethylurea,
3-[3-chloro-4-(*p*-dimethylaminobenzylthio)phenyl]-1,1-dimethylurea,
3-[3-chloro-4-(*p*-methylbenzyloxy)phenyl]-1,1-dimethylurea,
3-[3-chloro-4-(*p*-ethylaminobenzylsulfonyl)phenyl]-1,1-dimethylurea,
3-[4-(*p*-dimethylaminobenzylsulfinyl)phenyl]-1,1-dimethylurea,
3-[3-chloro-4-(*p*-methylthiobenzylthio)phenyl]-1,1-dimethylurea,
3-[4-(*p*-methylthiobenzylsulfonyl)phenyl]-1,1-dimethylurea,
3-[3-chloro-4-(*p*-methylsulfonylbenzylsulfinyl)phenyl]-1,1-dimethylurea,
3-[4-(*p*-methylsulfonylbenzylthio)phenyl]-1,1-dimethylurea,
3-{3-chloro-4-[*p*-(3,3-dimethylureido)benzylsulfonyl]-phenyl}-1,1-dimethylurea,
3-[4-(*p*-propionamidobenzylsulfinyl)phenyl]-1,1-diethylurea,
3-[3-chloro-4-(*p*-methoxybenzylthio)phenyl]-1,1-dimethylurea,
3-[4-(*p*-bromobenzylsulfonyl)phenyl]-1,1-dimethylurea,
3-[3-bromo-(*p*-benzylsulfinyl)phenyl]-1,1-dimethylurea,
1-[2-methyl-4-(benzylthio)phenyl]-3-*t*-butylurea,
3-[4-(*p*-methylbenzylsulfonyl)phenyl]-1,1-dimethylurea,
3-[3-chloro-4-(*p*-methylbenzylsulfinyl)phenyl]-1-*t*-butyl-1-methylurea,
3-[4-(*o*-methylbenzylthio)phenyl]-1,1-dimethylurea,
3-[3-chloro-4-(*o*-methylbenzylsulfonyl)phenyl]-1,1-dimethylurea,
3-[3-(*p*-cyanobenzylsulfinyl)phenyl]-1,1-dimethylurea,
1-[3-chloro-4-(*p*-methylbenzyloxy)phenyl]-3-*t*-butylurea,
3-[4-(*m*-trifluoromethylbenzyloxy)phenyl]-1,1-dimethylurea,
3-[4-(diphenylmethoxy)phenyl]-1,1-dimethylurea,
3-{4-[α-(*p*-chlorophenyl)-α-phenylmethylthio]-phenyl}-1,1-dimethylurea,
3-{3-[α-(*p*-methylphenyl)-α-phenylmethylsulfonyl]-phenyl}-1-*t*-butylurea, etc.

Other suitable phenylurea compounds, too numerous to mention, will be obvious from reference to Formula II above. They may be readily ascertained by substituting one substituent or position of substitution for those specifically illustrated above.

HERBICIDAL COMPOSITIONS AND METHODS

The substituted phenylurea compounds of this invention exhibit a broad range of contact, postemergence herbicidal activity as well as preemergence activity. They may be formulated as solids or liquids and directly applied to the foliage of the growing plants or incorporated in the soil or sand in which the plants are growing. Field application can be by such conventional techniques, as with powder dusters, boom and hand sprayers, spray dusters, addition to irrigation water and the like.

Generally, the phytotoxicants are initially formulated as concentrated compositions, comprising the active ingredient and a solid or liquid adjuvant. The adjuvant serves as a formulation aid or conditioning agent, permitting the concentrates to be further mixed with a suitable solid or liquid carrier, in a form which enables prompt assimilation by plant systems.

Useful liquid adjuvants in which the toxicant is dissolved, suspended or distributed include, for example, the following organic solvents and mixtures thereof: hexane, benzene, toluene, acetone, cyclohexanone, methyl ethyl ketone, isopropanol, butanediol, methanol, xylene, dioxane, isopropyl ether, ethylene dichloride, tetrachloroethane, hydrogenated naphthalene, solvent naphtha, and petroleum fractions, such as, kerosene.

Useful solid adjuvants in which the toxicant is adsorbed or dispersed on or in include, for example: natural clays, such as china clays, bentonites and attapulgites; other natural materials, such as, talc, pyrophyllite, quartz, diatomaceous earth, fuller's earth, chalk, rock phosphate, kaolin kieselguhr volcanic ash, salt and sulfur; chemically modified materials, such as acid washed bentonite, precipitated calcium phosphate, precipitated calcium carbonate, calcined magnesia, and colloidal silica; and other solid materials such as powdered cork, powdered wood and powdered pecan or walnut shells. For maximum adsorption and ease of handling, these materials are used in finely divided form of particles which range in size from 20 to 40 mesh (Tyler) or finer.

Prior to field application, the solid and liquid concentrate compositions are generally diluted by the addition of solid or liquid carriers. Suitable solid carriers, with which the concentrate compositions are mixed or adsorbed on or in, include: the previously mentioned solid adjuvants; fertilizers, such as, ammonium nitrate, urea, superphosphate, compost, manure and humus; pesticides; other herbicides; sand and the like. Suitable liquid carriers with which the concentrate compositions are dissolved, suspended, emulsified or dispersed include, for example, water and the liquid adjuvants previously mentioned.

Where solid concentrates are employed with liquid carriers they are advantageously employed in the form of powders made wettable by the addition of from about 1% to about 5% by weight of a dispersant, such as, a sodium salt of a high molecular weight carboxylic or sulfonic acid and about 1% to about 5% by weight of a wetting agent, such as, sodium oleylisethionate, lauryltrimethylammonium chloride, sodium lignin sulfate, etc., to a composition comprising about 25% to 90%, by weight, of the active compound and about 8 to about 73% by weight of the inert, finely divided solid. Three representative formulations are presented in Table I.

TABLE I

| Formulation No | Ingredients | Weight percent |
|---|---|---|
| I | 3-[m-(benzyloxy)phenyl]-1,1-dimethylurea | 25 |
|  | Attapulgite | 71 |
|  | Naphthalene sulfonic acid condensate [1] | 2 |
|  | Sodium N-methyl-N-oleoyl taurate | 2 |
| II | 3-p[-(benzylsulfinyl)phenyl]-1,1-dimethylurea | 50 |
|  | Attapulgite | 45 |
|  | Sodium lignin sulfonate [2] | 3 |
|  | Sodium oleylisethionate [3] | 2 |
| III | 1-[p-(benzylsulfonyl)phenyl]-3-methylurea | 75 |
|  | Diatomaceous earth | 20 |
|  | Naphthalene sulfonic acid condensate | 3 |
|  | Sodium oleylisethionate | 2 |

[1] Aereosol OS, American Cyanamid Company.
[2] Marasperse N, Marathon Corporation.
[3] Igepon A, Antara Chemicals Corporation.

Dusts are usually prepared by grinding together from about 1% to about 25% by weight of the active ingredient with a solid adjuvant and solid carrier. In preparing dust concentrates the active ingredient is usually added in from about 25% to about 90% concentrations.

Emulsifiable concentrates can be prepared by dissolving the active ingredient (about 25% to about 75% by weight) in an organic solvent, such as, acetone, methylisobutylketone, cyclohexanone, xylene or toluene and an emulsifier (about 1% to 10% by weight), such as, for example, a non-ionic-anionic blend containing calcium dodecylbenzene sulfonate, such as Toximul R-S by Ninol Laboratories, Inc. and optionally a surfactant (about 1% to about 5%), such as, sodium lignin sulfonate. A representative formulation is presented in Table II.

TABLE II

| Formulation No. | Ingredients | Weight percent |
|---|---|---|
| IV | 3-[p-(benzylthio)phenyl]-1,1-dimethylurea | 25 |
|  | Cyclohexanone | 65 |
|  | Toximul R, Toximul S (equal parts) | 10 |

In general, postemergence control of undesirable plant species is achieved by field applications in which the active ingredient is applied in from about 0.5 ounce to about 25 pounds per acre. The preferred range is from about ½ ounce to about 4 pounds per acre. Preemergence control is generally achieved by applications to the soil of from about 1 to about 25 pounds of the active ingredient per acre.

The following examples illustrate the present invention but are not to be taken as limitative thereof. All parts and percentages are by weight unless otherwise indicated.

EXAMPLE 1

Preparation of 3-[p-(p-chlorobenzyloxy)phenyl]-1,1-dimethylurea

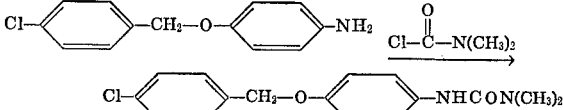

To a solution of p-(chlorobenzyloxy)aniline (3.5 g., 0.015 mole) in dry dimethylformamide (DMF) (80 ml.) and dry triethylamine (3 ml.) was added dropwise with stirring an excess of dimethylcarbamoyl chloride (2.5 gm., 0.024 mole). The solution was set aside for 24 hours and then poured onto ice-water (250 g.). The desired product, 3-[p-(p-chlorobenzyloxy)phenyl]-1,1-dimethylurea, in the form of a white crystalline precipitate, was removed by filtration and purified by recrystallization from a benzene-n-hexane mixture to give colorless needles weighing 2.3 g. (49%) and having a m.p. of 149.5°–150° C.

*Analysis.*—Calcd. for $C_{16}H_{17}N_2O_2Cl$: C, 63.05; H, 5.58; N, 9.19; Cl, 11.93. Found: C, 62.71; H, 5.66; N, 9.19; Cl, 11.56.

EXAMPLES 2–8

The urea compounds set forth in Table III below were prepared by the general procedure of Example 1, substituting the indicated base-solvent mixture and the appropriate aniline and carbamoyl chloride compounds for the p-(chlorobenzyloxy)-aniline and dimethylcarbamoyl chloride used therein.

EXAMPLE 9

Preparation of 1-[3-(benzyloxy)phenyl]-3-methylurea

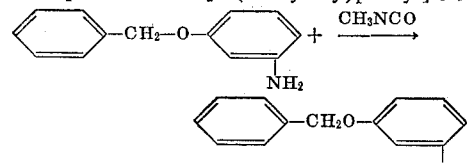

To 3-benzyloxyaniline (4 g., 0.02 mole), in dry ether (100 ml.) and triethylamine (1 drop) was added methyl isocyanate (2 g., 0.035 mole) at 10° with stirring. The mixture was set aside at 25° C. for 20 hours. The desired product, 1-[3-(benzyloxy)phenyl[-3-methylurea, in the form of a crystalline precipitate, was removed from solution by filtration and dried. The crystalline product was recrystallized from benzene to give 3.3 g. (66% theoretical yield) of purified 1-[3-(benzyloxy)phenyl]-3-methylurea having a m.p. of 154–154.5° C.

*Analysis.*—Calcd. for $C_{15}H_{16}N_2O_2$: C, 70.29; H, 6.29; N, 10.93. Found C, 70.18; H, 6.09; N, 10.84.

EXAMPLES 10–13

The urea compounds set forth in Table IV below were prepared by the general procedure of Example 9, substituting the indicated base-solvent mixture and appropriate aniline and isocyanate compounds for the 3-benzyloxyaniline and methylisocyanate used therein.

TABLE III

| Ex. | Compound | Solvent | Recrystallized from— | M.P., °C. | Yield, percent | Calculated C | Cl | H | N | S | Found C | Cl | H | N | S |
|---|---|---|---|---|---|---|---|---|---|---|---|---|---|---|---|
| 2 | 3-[m-(benzyloxy)phenyl]-1,1-dimethylurea | DMF-pyridine. | Benzene | 127.5–128.5 | 17 | 71.09 |  | 6.71 | 10.36 |  | 71.59 |  | 6.9 | 10.04 |  |
| 3 | 3-[p-(benzyloxy)phenyl]-1,1-dimethylurea | do | do | 159.5–160 | 53 | 71.1 |  | 6.7 | 10.36 |  | 71.1 |  | 6.2 | 9.89 |  |
| 4 | 3-[p-(benzylthio)phenyl]-1,1-dimethylurea | do | Benzene-cyclohexane. | 144.5–145 | 60 | 67.1 |  | 6.3 | 9.8 | 11.2 | 67.1 |  | 6.2 | 9.8 | 11.2 |
| 5 | 3-[3-chloro-4-(p-chlorobenzyloxy)phenyl]-1,1-dimethylurea | DMF-triethylamine. | Benzene | 184–185 | 33 | 56.7 |  | 4.8 | 8.3 |  | 56.7 |  | 4.7 | 7.9 |  |
| 6 | 3-[4-(benzyloxy)-3-chlorophenyl]-1,1-dimethylurea | do | Benzene-hexane. | 116–117.5 | 34 | 63.1 | 11.9 | 5.6 | 9.2 |  | 63.5 | 11.8 | 5.6 | 8.8 |  |
| 7 | 3-[4-(p-methylbenzyloxy)-3-chlorophenyl]-1,1-dimethylurea | do | Benzene | 144–144.5 | 56 | 64.0 | 11.1 | 6.0 | 8.8 |  | 64.1 | 11.3 | 6.0 | 8.4 |  |
| 8 | 1-[4-(p-methylbenzyloxy)phenyl]-3,3-dimethylurea | do | do | 149.5–150.5 | 23 | 71.8 |  | 7.1 | 9.9 |  | 71.6 |  | 7.4 | 10.0 |  |

TABLE IV

| Ex. | Compound | Solvent-base mixture | Recrystallized from— | M.P., °C. | Yield, percent | Calculated | | | | | Found | | | | |
|---|---|---|---|---|---|---|---|---|---|---|---|---|---|---|---|
| | | | | | | C | Cl | H | N | S | C | Cl | H | N | S |
| 10 | 1-[p-(benzylthio)phenyl]-3-methylurea. | Ether-triethylamine. | Benzene. | 145-145.5 | 60 | 66.2 | | 5.9 | 10.3 | 11.8 | 66.2 | | 5.9 | 10.2 | 11.6 |
| 11 | 1-[4-(p-cholorobenzyloxy)-phenyl]-3-methylurea. | Ether-pyridine. | Benzene-methanol. | 205-206 | 80 | 62.0 | 12.2 | 5.2 | 9.6 | | 62.0 | 10.4 | 5.5 | 9.4 | |
| 12 | 1-[3-chloro-4-(p-chlorobenzyloxy)phenyl]-3-methylurea. | Ether-benzene-pyridine. | Ethylacetate-n-hexane. | 189.5-190.5 | 35 | 55.4 | | 4.3 | 8.6 | | 55.5 | | 4.3 | 8.6 | |
| 13 | 1-[3-chloro-4-(p-methylbenzyloxy)phenyl]-3-t-butylurea. | Acetone-pyridine. | Acetone-benzene. | 214-215 | 63 | 65.80 | 10.24 | 6.64 | 8.08 | | 65.84 | 10.36 | 8.81 | 7.99 | |

EXAMPLE 14

Preparation of 3-[p-(benzylsulfonyl)phenyl]-1,1-dimethylurea

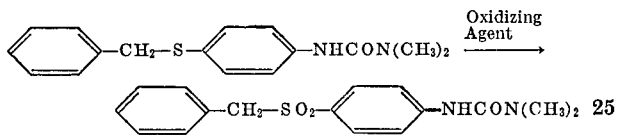

A chloroform (50 ml.) solution of 3-[p-(benzylthio)-phenyl]-1,1-dimethylurea (1.5 g., 0.005 mole) was cooled to 10° C. and 85% aqueous solution of m-chloroperbenzoic acid (2 g., 0.01 mole) was added dropwise stirring. After the addition, the solution was set aside at 22° C. for 1 hour and 20 hours at 10° C. The solution was washed successively with 10% aqueous sodium carbonate and water. The washed solution was dried over anhydrous magnesium sulfate, filtered and then distilled to remove the solvent leaving a solid having a m.p. of 162–163.5° C. The solid was then purified by recrystallizing from an ethyl acetate-hexane (8:1) mixture to produce a white crystalline solid having a m p. of 183.5–184.5° C., weighing 1.1 g. (33% theoretical yield).

*Analysis.*—Calcd. for $C_{16}H_{18}N_2SO_3$: C, 60.4; H, 5.7; N, 8.8; S, 10.1. Found: C, 60.4; H, 5.6; N, 8.9; S, 10.0.

EXAMPLES 15–16

The urea compounds set forth in Table V below were prepared by the general procedure of Example 14, substituting the appropriate benzylthio compound for the 3-[p-(benzylthio)-phenyl]-1,1-dimethylurea used therein.

was added to a solution of 3-(m-hydroxyphenyl)-1,1-dimethylurea (3.6 g., 0.02 mole) in anhydrous acetone (100 ml.) and the resulting mixture was heated with stirring under reflux for a period of about 30 minutes. Then p-cyanobenzyl bromide (4 g., 0.02 mole) in anhydrous acetone (50 ml.) was added and the reflux was continued for 3 days. Absolute ethanol (100 ml.) was then added and the reflux was continued for 1 day. The resulting mixture was poured onto an ice cold, 10% aueous solution of sodium carbonate and then extracted with benzene.

The reaction mixture was separated by chromatography on a silica gel column. The unreacted p-cyanobenzyl bromide was first eluted from the column with benzene. The desired product, 3-[3-(p-cyanobenzyloxy)phenyl]-1,1-dimethylurea was then eluted from the column with a mixture of methylene chloride and acetone (9:1). The solvent was removed by evaporation, leaving 1.8 g. (30% theoretical yield). Purification was effected by recrystallization from benzene producing a crystalline product having a m.p. of 154°–155° C. and the following elemental analysis:

Calcd. for $C_{17}H_7N_3O_2$: C, 69.13; H, 5.8; N, 14.23. Found: C, 69.30; H, 5.87; N, 14.13.

EXAMPLES 18–19

The urea compounds set forth in Table VI below were prepared by the general procedure of Example 17, sub-

TABLE V

| Ex. | Compound | Recrystallized from— | M.P., °C. | Yield, percent | Calculated | | | | Found | | | |
|---|---|---|---|---|---|---|---|---|---|---|---|---|
| | | | | | C | H | N | S | C | H | N | S |
| 15 | 3-[p-(benzylsulfinyl)phenyl]-1,1-dimethylurea. | Ethyl acetatebenzene | 131-137 | 30 | 63.6 | 6.0 | 9.3 | 10.6 | 63.6 | 5.8 | 8.6 | 9.9 |
| 16 | 1-[p-(benzylsulfonyl)phenyl]-3-methylurea hemihydrate. | Chloroform | 178.5-179.5 | 90 | 59.2 | 5.3 | 9.2 | 10.5 | 57.1 | 5.3 | 8.8 | 10.5 |

EXAMPLE 17

Preparation of 3-[3-(p-cyanobenzyloxy)phenyl]-1,1-dimethylurea

Anhydrous potassium carbonate (2.8 g., 0.02 mole)

stituting the appropriate hydroxy and benzyl bromide compounds for the 3-(m-hydroxyphenyl)-1,1-dimethylurea and p-cyanobenzyl bromide used therein.

TABLE VI

| Ex. | Compound | M.P., °C. | Yield, percent | Calculated | | | | Found | | | |
|---|---|---|---|---|---|---|---|---|---|---|---|
| | | | | C | Cl | H | N | C | Cl | H | N |
| 18 | 3-[3-(p-chorobenzyloxy)-phenyl]-1,1-dimethylurea | 144-145 | 16 | 63.05 | 11.05 | 5.58 | | 63.25 | 11.25 | 5.55 | |
| 19 | 3-[3-(p-nitrobenzyloxy)-phenyl]-1,1-dimethylurea | 144-145 | 16 | 60.94 | | 5.43 | 13.33 | 61.16 | | 5.31 | 13.28 |

EXAMPLES 20–31

Postemergence Herbicidal Activity

The postemergence herbicidal activity of the compounds of Formula I is demonstrated by the following tests wherein a variety of monocotyledonous and dicotyledonous plants are treated with representative compounds dispersed in aqueous-acetone mixtures. In the tests, seedling plants are grown in jiffy flats for about two weeks. The test compounds are dispersed in 50/50, by volume, acetone/water mixtures in sufficient quantity to provide the equivalent of about 0.125 to about 10 pounds per acre of active compound when applied to the plants with an overhead greenhouse sprayer calibrated to deliver 86 gallons per acre. After spraying, the plants are placed on greenhouse benches and are cared for in the usual manner, commensurate with conventional greenhouse practices. Two weeks after treatment, the seedling plants are examined and rated according to the Herbitoxicity Indices provided below. The data obtained are reported in Table VII.

Herbitoxicity Indices

9 = 100% reduction in stand
9− = 1 or 2 stunted plants remaining
8 = 85–99% reduction in stand
7 = 70–84% reduction in stand
6 = 60–69% reduction in stand
5 = 50–59% reduction in stand
4 = 40–49% reduction in stand
3 = 30–39% reduction in stand
2 = 20–29% reduction in stand
1 = 10–19% reduction in stand
0 = no apparent effect s = severe injury
m = moderate injury
t = trace to slight injury
— = no test
c = chlorosis
g = growth retarded
a = abnormal growth
r = regrowth

Plant Abbreviations

KO = Kochia
LA = Lambsquarters
Mu = Mustard
PI = Pigweed
BA = Barnyard grass
CR = Crabgrass
GRF = Greenfoxtail
WO = Wild Oats
COR = Corn
COT = Cotton
SOY = Soybean
SB = Sugarbeets
TO = Tomato
WH = Wheat

TABLE VII

| Example | Compound | Rate, lbs./acre | KO | LA | MU | PI | BA | CR | GRF | WO | COR | COT | SOY | SB | TO | WH |
|---|---|---|---|---|---|---|---|---|---|---|---|---|---|---|---|---|
| 20 | phenyl-CH₂-O-phenyl-NHCON(CH₃)₂ | 10 | 10 | 9 | 9 | 9 | 9 | 9 | — | 9 | — | — | — | — | 9 | t |
|  |  | 4 | 9 | 9 | 9 | 9 | 9 | 9 | 9 | 9 | — | — | — | — | — | — |
|  |  | 2 | t | — | — | — | 3 | 3 | 3 | 3 | — | — | — | — | — | — |
| 21 | phenyl-CH₂-O-phenyl-NHC(O)N(H)CH₃ | 10 | 10 | 9 | 9 | 9 | 3 | 9 | — | 9 | — | — | — | — | 9 | t |
|  |  | 4 | 9 | 9 | 9 | 9 | 3 | 9 | 5 | 9 | — | — | — | — | — | — |
|  |  | 2 | t | — | — | — | 0 | 5 | — | 3 | — | — | — | — | — | — |
| 22 | phenyl-CH₂-O-phenyl-NHCON(CH₃)₂ | 10 | 10 | 9 | 9 | 9 | 9 | 9 | — | 7−3 | 9 | — | — | — | 9 | t |
|  |  | 4 | 9 | 9 | 9 | 9 | 3 | 9 | 9 | 3 | 9 | — | — | — | — | — |
|  |  | 2 | 9− | 8 | — | — | 5 | 5 | 9 | — | 9− | — | — | — | — | — |
|  |  | ¼ | 9− | — | — | — | — | — | — | — | — | — | — | — | — | — |
| 23 | phenyl-CH₂-S-phenyl-NHCONHCH₃ | 10 | 10 | 9 | 9 | m | 9 | 9 | 9 | 9 | 9 | 9 | t | 9 | 9 | t |
|  |  | 4 | 9 | 9 | 9 | 9 | 7 | — | t | t | 9 | 9 | 9 | 9 | — | — |
|  |  | 1 | 9 | 9 | 9 | 9 | t | 3 | t | 0 | 9− | 9− | 8 | 9 | — | — |
|  |  | ½ | 3 | — | — | — | t | — | — | — | — | — | — | — | — | — |
| 24 | phenyl-CH₂-S-phenyl-NHCON(CH₃)₂ | 10 | 10 | 9 | 9 | 9 | 9 | 9 | 9 | 9 | 9 | 9 | t | 9 | 9 | t |
|  |  | 4 | 9 | 9 | 9 | 9 | t | 3 | 9 | t | 9 | 9− | 9 | 9 | — | — |
|  |  | 1 | 9 | 9 | 9 | 9 | t | 1 | 9 | t | 9− | 9− | 8 | 5 | — | — |
|  |  | ½ | 9− | — | — | — | — | — | — | — | — | — | — | — | — | — |
| 25 | phenyl-CH₂SO-phenyl-NHCON(CH₃)₂ | 10 | 10 | 9 | 9 | 9 | 3 | 7 | — | t | — | — | — | — | 9 | m |
| 26 | phenyl-CH₂SO-phenyl-NHCON(CH₃)₂ | 10 | 10 | 8 | — | — | — | 0 | — | 0 | — | — | — | — | m | 0 |
| 27 | Cl-phenyl-CH₂-O-phenyl-NHCONHCH₃ | 2 | 2 | 9 | 9 | 9 | 3 | 9− | 3 | t | 9− | 9 | t | 9 | — | 0 |
|  |  | ¼ | t | t | 9 | 9− | 5 | t | t | 0 | 3 | 5 | 9 | 9 | — | — |
|  |  | ¹⁄₁₆ | t | t | 5 | 5 | 3 | t | t | 0 | 3 | m | t | 7 | — | — |
|  |  | ¹⁄₃₂ | t | t | 3 | — | t | t | t | — | 9 | — | t | 3 | — | — |

TABLE VII—Continued

| Example | Compound | Rate, lbs./acre | KO | LA | MU | PI | BA | CR | GRF | WO | COR | COT | SOY | SB | TO | WH |
|---|---|---|---|---|---|---|---|---|---|---|---|---|---|---|---|---|
| 28 | Cl-⟨⟩-CH₂-O-⟨⟩-NHCON(CH₃)₂ | 2, ¼, ¹⁄₁₆, ¹⁄₃₂ | 9,9,9,m | 9,9-,7 | 9,9,9 | 9,9,9 | 9,3,5,t | 9-,8,3,3 | 9-,-,3,t | 3,-,-,0 | 9,9,9,8 | 9,9,9 | 9,9,5,m | 9-,-,- | — | — |
| 29 | Cl-⟨⟩-CH₂-O-⟨⟩(Cl)-NHCONHCH₃ | 2, ¼, ¹⁄₁₆, ¹⁄₃₂ | 9,9,5,t | 9,9,3 | 9,9,9 | 9,9,9 | 5,9-,t | 9-,t,3 | 8,t,t | t,t,t | 9-,t,3,t | 9,9,m | 9,9-,t | 9,9,- | — | — |
| 30 | Cl-⟨⟩-CH₂-O-⟨⟩(Cl)-NHCON(CH₃)₂ | 2, ¼, ¹⁄₁₆, ¹⁄₃₂ | 9,9,9 | 9,9,9- | 9,9,9 | 9,9,9 | 5,5,3,t | 8,9,7,3 | 9-,9,9,7 | t,t,t | 9,9,9 | 9,9,9 | 9,9-,t | 9,9,5 | — | — |
| 31 | Cl-⟨⟩-CH₂-O-⟨⟩(Cl)-NHCON(CH₃)₂ | 2, ¼, ¹⁄₁₆, ¹⁄₃₂ | 9,9,9 | 9,9,9 | 9,9,9 | 9-,t,7,3 | 9,3,5,t | 9-,3,3 | 5,3,3,t | 9,3,3,9 | 9,9,9 | 9-,t,t,m | 9,9,9,5 | — | — | — |

EXAMPLES 32-38

Preemergence Herbicidal Activity in Soil

The preemergence herbicidal activity of the compounds of Formula I is exemplified by the following tests in which the seeds of a variety of monocotyledonous and dicotyledonous plants are treated with representative compounds. In each case, the seeds are separately mixed with potting soil and planted on top of approximately one inch of potting soil in separate pint cups. After planting, the cups are sprayed with the selected aqueous-acetone solution containing the herbicidal compounds in sufficient quantity to provide their application at rates of from about 1.0 to 25 pounds of active compound per acre. The treated cups are then placed on greenhouse benches and cared for in accordance with conventional greenhouse procedures. Three weeks after treatment, each cup is examined and rated according to the Herbitoxicity Indices set forth in Example 20. The results are reported in Table VIII.

TABLE VIII

| Ex. | Compound | Rate, lbs./acre | KO | LA | MU | PI | BA | CR | GRF | WO | M_I |
|---|---|---|---|---|---|---|---|---|---|---|---|
| 32 | ⟨⟩-CH₂-SO₂-⟨⟩-NHCON(CH₃)₂ | 25, 15, 5 | 9, 9, 9- | 9, 8, — | 9, 9, 7 | 9, 9, 9 | 9, 3, 0 | 9, 3, 3 | 5, 0, 0 | — | 5 |
| 33 | ⟨⟩-CH₂-O-⟨⟩-NHCON(CH₃)₂ | 25, 4, 1 | 9, 3, 0 | 9, 0, 0 | 9, 0, 0 | 9, 0, 3 | 9, 0, 0 | 3, 0, 0 | 5, 0, 0 | 0, 0, 0 | 9 |
| 34 | ⟨⟩-CH₂-S-⟨⟩-NHCON(CH₃)₂ | 15, 5 | 8, 5 | 7, 3 | 9, 3 | 9, 9 | 9, 3, 3 | 3, 3, 3 | 3, 0, 0 | 0, 0 | 0 |
| 35 | ⟨⟩-CH₂-O-⟨⟩-O-⟨⟩-NHCON(CH₃)₂ | 25, 4 | 9-, 3 | 7 | 9c, 5 | 8 | 0 | 0 | 0 | 0 | 8 |
| 36 | ⟨⟩-CH₂-O-⟨⟩-O-⟨⟩-NHC(=O)-N(H)(CH₃) | 25 | 9c | | | | | | | | |
| 37 | ⟨⟩-CH₂-O-⟨⟩(Cl)-NH-CO-N(CH₃)₂ | 4, 1 | 9, 9- | 9-, 3 | 9, 3 | 9, 7 | 3, 0 | 5, 3 | 3, 0 | 0, 0 | |
| 38 | Cl-⟨⟩-CH₂-O-⟨⟩-NH-CO-N(CH₃)₂ | 4, 1 | 7, 3 | 8, 3 | 9-, 3 | 9, 3 | 3, 0 | 5, 3 | 3, 0 | 0, 0 | |

EXAMPLE 39

Preemergence Herbicidal Activity in Sand

The preemergence herbicidal activity of the compounds of Formula I is evident from the following greenhouse procedures in which seeds of Morning-Glory (*Ipomoea purpurea*) and Barnyard grass (*Echinochloa crusgalli*) were treated with representative compounds. The seeds were separately sown in 3.5 inch wax paper cups containing 335 grams of quartz sand. The seeds were placed approximately 3/8 inches below the surface of the sand and sufficient Hoagland's nutrient was added in sufficient quantity to produce about 17% moisture by weight. The herbicidal compounds were added by pipetting 2 ml. of an acetone/water (50/50, by volume) solution onto the surface of the sand. For purposes of comparison 3-[p-(p'-chlorophenoxy)phenyl]-1,1-dimethylurea, a commercial herbicide in the form of a 50% wettable powder formulation, was also applied in 2 ml. of water. In each case, quantities of the herbicidally active compound sufficient to establish a rate of application equivalent to 1/8, 1/4, 1 and 4 lb./acre were employed. The treated cups were placed in a greenhouse for a period of about 3 weeks. Each day sufficient Hoagland nutrient solution was added to maintain the moisture level at 17%. Thereafter, the cups were removed from the greenhouse and the plants severed at the surface of the sand. The plants were immediately weighed and the rate of application required to produce 90% inhibition of growth was determined with the aid of a weight of a control plant, by plotting the percent of control achieved against the rate of application employed on log probability graph paper. The required rates of application are set forth below in Table IX.

TABLE IX

| Compound | Rate (lb./acre) for 90% inhibition of— | |
|---|---|---|
| | Morning Glory | Barnyard grass |
| ⌬—CH$_2$—O—⌬—NHCON(CH$_3$)$_2$ | 0.47 | 0.40 |
| Cl—⌬—CH$_2$O—⌬—NHCON(CH$_3$)$_2$ | 0.29 | 0.60 |
| ⌬—CH$_2$O—⌬(Cl)—NHCON(CH$_3$)$_2$ | 0.25 | 3.70 |
| Cl—⌬—O—⌬—NHCON(CH$_3$)$_2$ | 1.20 | 4.80 |

What is claimed is:

1. A compound of the formula:

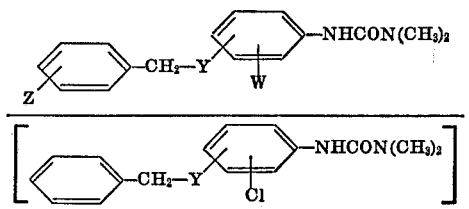

wherein Z is H or Cl, W is H or Cl, Y is S, O, SO or SO$_2$ and the substituents W and Y are attached at the 3 and 4 positions of the benzene ring.

2. The compound 3-[4-(benzyloxy)-3-chlorophenyl]-1,1-dimethylurea.

3. The compound 3-[3-chloro-4-(p-chlorobenzyloxy)phenyl]-1,1-dimethylurea.

4. The compound 3-[(p-chlorobenzyloxy)phenyl]-1,1-dimethylurea.

5. The compound 3-[p-(benzyloxy)phenyl]-1,1-dimethylurea.

References Cited

FOREIGN PATENTS

| | | | |
|---|---|---|---|
| 6906048 | 10/1969 | Netherlands | 260—553 A |
| 1,918,113 | 11/1969 | Germany | 260—553 A |
| 2,006,525 | 12/1969 | France | 260—553 A |
| 1,269,407 | 7/1961 | France | 260—553 A |

OTHER REFERENCES

Wagner et al.: Ann., vol. 675, p. 189–99 (1964).

BERNARD HELFIN, Primary Examiner

M. W. GLYNN, Assistant Examiner

U.S. Cl. X.R.

260—453 A, 453 PH, 465 B, 465 E, 471 A, 518, 575; 71—105, 108, 116, 120

UNITED STATES PATENT OFFICE
CERTIFICATE OF CORRECTION

Patent No. 3,819,697　　　　　　　　Dated June 25, 1974

Inventor(s) BARRINGTON CROSS

It is certified that error appears in the above-identified patent and that said Letters Patent are hereby corrected as shown below:

Claim 1, Column 18, delete the underlining from the first formula.

Claim 1, Column 18, delete the entire second formula and brackets.

Signed and sealed this 15th day of October 1974.

(SEAL)
Attest:

McCOY M. GIBSON JR.　　　　　　　　C. MARSHALL DANN
Attesting Officer　　　　　　　　　　Commissioner of Patents